(12) United States Patent
Edris

(10) Patent No.: US 8,179,104 B2
(45) Date of Patent: May 15, 2012

(54) AUTOMATIC SELF-ADJUSTING VOLTAGE CONTROLLER

(75) Inventor: Abdel-Aty Edris, Sunnyvale, CA (US)

(73) Assignee: Siemens Energy, Inc., Orlando, FL (US)

( * ) Notice: Subject to any disclaimer, the term of this patent is extended or adjusted under 35 U.S.C. 154(b) by 382 days.

(21) Appl. No.: 12/613,807

(22) Filed: Nov. 6, 2009

(65) Prior Publication Data

US 2011/0109280 A1    May 12, 2011

(51) Int. Cl.
*G05F 1/70* (2006.01)
(52) U.S. Cl. ........... 323/207; 323/215; 363/17; 307/102
(58) Field of Classification Search .......... 323/207–216, 323/255, 258, 343, 356; 307/102, 105, 109, 307/126, 140; 363/59–65, 16–17, 88, 98, 363/132, 34, 37, 39, 127, 56.12; 361/42, 361/58, 62, 88, 111
See application file for complete search history.

(56) References Cited

U.S. PATENT DOCUMENTS

| | | | |
|---|---|---|---|
| 5,198,746 A | 3/1993 | Gyugyi | |
| 5,329,221 A | 7/1994 | Schauder | |
| 5,343,139 A | 8/1994 | Gyugyi | |
| 5,469,044 A | 11/1995 | Gyugyi | |
| 5,751,138 A * | 5/1998 | Venkata et al. | 323/207 |
| 5,754,035 A * | 5/1998 | Sen | 323/207 |
| 6,172,488 B1 * | 1/2001 | Mizutani et al. | 323/207 |
| 6,462,518 B1 * | 10/2002 | Fischer et al. | 323/207 |
| 7,091,703 B2 | 8/2006 | Folts | |
| 7,330,363 B2 * | 2/2008 | Ponnaluri et al. | 363/71 |
| 7,436,155 B2 * | 10/2008 | Renken | 323/207 |

* cited by examiner

*Primary Examiner* — Rajnikant Patel

(57) ABSTRACT

An apparatus (14/18) for controlling a voltage on a transmission line (10). The apparatus (14/18) comprises a first voltage sourced converter controller (18) connected to a first node (22) of the transmission line (10); a second voltage sourced converter controller (14) connected to a second node (20) of the transmission line (10), the second node (20) spaced apart from the first node (22) wherein the first voltage sourced converter controller (18) supplies capacitive reactive current and the second voltage sourced converter controller (14) absorbs inductive reactive current to control the voltage.

14 Claims, 1 Drawing Sheet

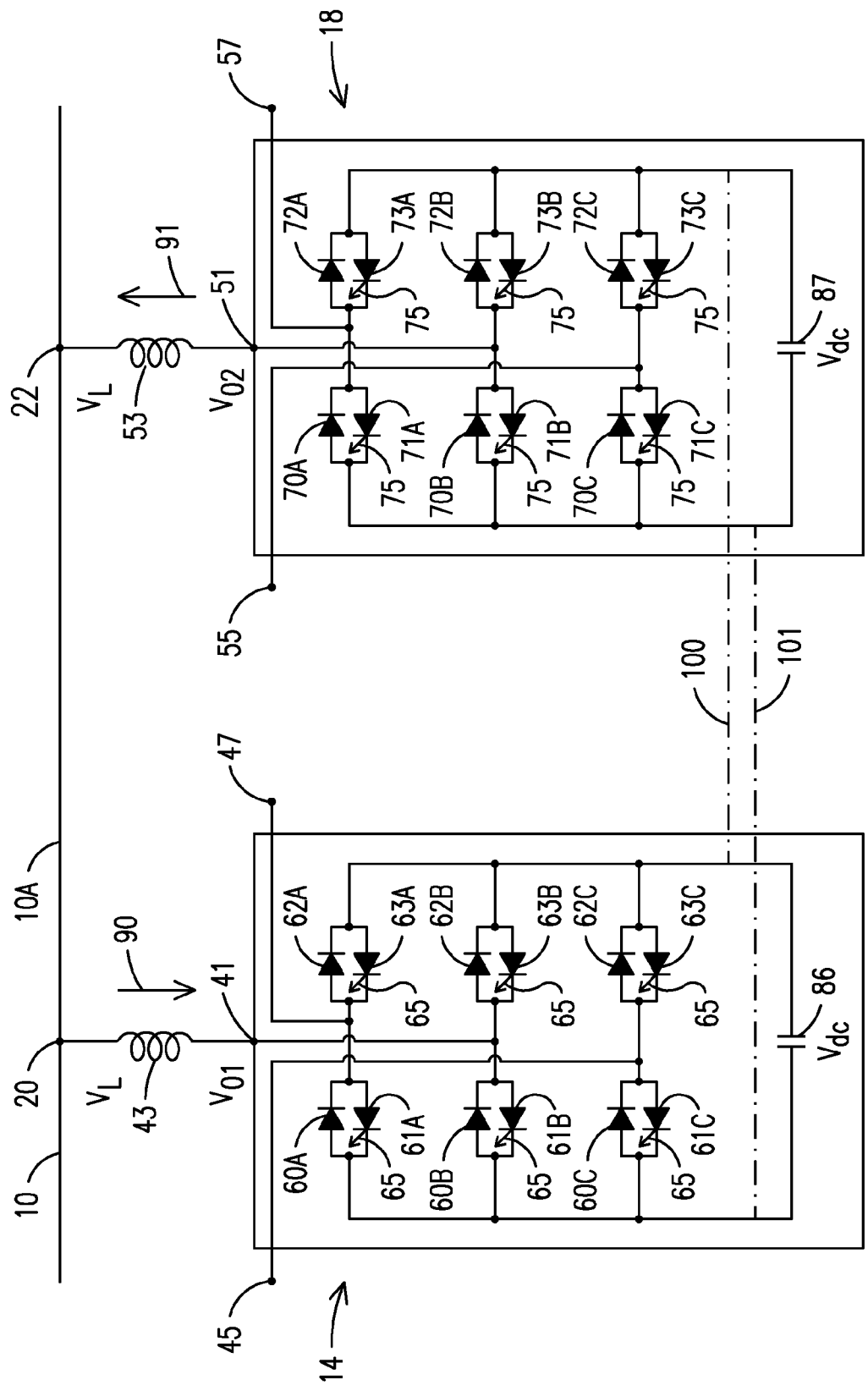

AUTOMATIC SELF-ADJUSTING VOLTAGE CONTROLLER

FIELD OF THE INVENTION

The present invention relates generally to control of power systems and more specifically to an automatic self-adjusting controller for controlling the voltage on a power transmission or distribution line.

BACKGROUND OF THE INVENTION

Typically there is a phase angle difference between a sinusoidal current on a power grid as supplied by an alternating current generator and a voltage at the generator's terminals. This phase angle difference between the voltage and the current is due to the nature of the load on the power grid. For a purely resistive load (i.e., having no energy storage properties) the voltage and current are in phase, i.e., the current and voltage reverse their polarity simultaneously and a direction of power flow remains fixed and does not reverse.

For a purely reactive load the current and voltage are 90 degrees out of phase and the net power flow is zero as the power flows to and returns from the load due to the energy storage features of the reactive load. If the reactive load is purely inductive, the current lags the voltage by 90 degrees. A lag angle is between 0 and 90 degrees for a load that is both inductive and resistive. For a purely reactive capacitive load the current leads the voltage by 90 degrees. A lead angle is between 0 degrees and 90 degrees for a load with both resistive and capacitive properties. Thus the magnitude of the phase angle difference depends on the resistance, inductance and capacitance of the load to which the generator supplies power and on the characteristics and operating point of the generator.

A capacitive load tends to raise the system voltage (also referred to as the transmission line voltage) while an inductive load tends to lower the system voltage. Lightly loaded transmission lines also tend to raise the system voltage and heavily loaded lines tend to reduce the system voltage.

For a load with both reactive and resistive properties, the current phase angle (relative to the voltage phase angle, which for simplicity is assumed to be 0°) can be resolved into an in-phase component (i.e., in-phase with the voltage) and an out-of-phase component (i.e., a 90 degrees out-of-phase with the voltage). The component of the current that is in phase with the voltage delivers real or active power to the load. The component of current that is phase-shifted by 90 degrees from the voltage, referred to as reactive power, performs no useful work. The energy associated with this current flows from the generator to the load and then back to the generator, resulting in a net zero energy transfer.

The loading capability of a power transmission system is limited by thermal, dielectric and stability considerations. It is possible, but not necessarily practical, to control system real power directly. It is known that negotiating, injecting or drawing real power from a transmission or distribution bus affects the voltage at that bus. But this technique requires a real energy storage device, such as a battery or a superconducting storage device.

The transmission line power or system voltage can also be indirectly controlled by generating or absorbing reactive power from the transmission or distribution system. It is known that negotiating reactive power results in a more significant impact on system voltage than negotiating real power. DC capacitors can store and provide voltage/current to achieve reactive power control, but they do not store sufficient energy for controlling real power. Also, a system lacking adequate dynamic reactive power support (generating or absorbing reactive power) can result in voltage instability that may in turn lead to a voltage collapse, i.e., a blackout.

It is also known that as the reactive power increases it further reduces the amount of real power the system can carry. This limits the ability of the power system operator to meet the power demands of its users, as further increasing the amount of real power may cause the thermal limits of the transmission lines to be exceeded. The generation and control of reactive power in an electrical transmission system is therefore important to the overall power system efficiency and stability.

Generally, a capacitor supplies reactive power (i.e., supplies VARS) and an inductor absorbs reactive power (i.e., absorbs VARS). Thus if the transmission line voltage is low, capacitive reactive power needs to be supplied to the line to increase the line voltage. When the line voltage is high, inductive reactive power needs to be absorbed to lower the line voltage. Thus supplying or absorbing reactive power raises or lowers the line voltage, respectively.

Generating units can produce or absorb reactive power, although they cannot react quickly to power control demands. Capacitive and inductive compensators can be switched in and out of the transmission system, between a generator and a load, relatively quickly to generate or absorb reactive power as required to maintain the system voltage. Capacitors, capacitive loads and capacitive compensators are considered generators of reactive power. Inductors, inductive loads (e.g., transformers and motors) and inductive compensators are considered consumers or absorbers of reactive power.

If a transmission or distribution line segment supplying reactive power (using a capacitive reactive power compensator, for example) trips out of service, the amount of supplied reactive power declines and the system voltage drops on other segments of the transmission or distribution line that remain in-service. Conversely, a transmission line voltage can increase when loads are removed from the transmission line (automatic load rejection) or when the line is lightly loaded. Under the latter scenario, inductive reactive power compensators (consuming reactive power) are switched into service to reduce the transmission line voltage.

Electric power transmission systems are designed recognizing that the three power system parameters of impedance, voltage and power angle (i.e., a difference between a voltage phasor phase angle at a first end of a transmission line and a voltage phasor phase angle at a second end of the transmission line), cannot be controlled fast enough to accommodate dynamic system conditions. Furthermore, available control devices usually compensate or control only one of the three variables. Thus transmission and distribution systems having been designed with fixed or mechanically-switched series and shunt reactive compensations and voltage regulating and phase-shifting transformer tap changers to optimize line impedance, minimize voltage variation, and control power flow under steady-state or slowly changing load conditions.

The dynamic system problems are typically addressed by over-design, i.e., designing the system with generous stability margins to recover from worst case contingencies resulting from faults, line and generator outages, and equipment failures. This practice of over-design results in under utilization of the transmission system.

In recent years, energy demands, environmental considerations, right-of-way access, and cost issues have delayed the construction of both generation facilities and new transmission lines. This has necessitated a change in the traditional power system concepts and practices; better utilization of existing power systems has become imperative. But higher utilization of power transmission and distribution systems, without an appreciable degradation in the reliability of the supply of electric power is possible only if power flow can be controlled rapidly following dynamic system disturbances.

Power system stability is a measure of a power system's ability to provide electric power to meet load demand when power system conditions change. Various devices are in use to stabilize bulk-power transmission and distribution systems and to improve transient and dynamic stability of the power system. These devices, referred to generally as flexible AC transmission system (FACTS) devices can supply or absorb reactive power and in this way provide rapid voltage regulation and power flow control. FACTS devices include: static-var compensators (SVC), static synchronous compensators (STATCOMs), and thyristor-controlled series capacitors (TSCSs). Use of these devices to limit effects of the power system impedance changes permits loading of the transmission facilities to levels approaching their ultimate thermal capacity. These devices may supply or absorb reactive power to support the system voltage or provide power modulation to damp electromechanical oscillations. In any case, the FACTS devices control the voltage, impedance or phase angle (between the current and the voltage) on the power system.

STATCOM devices lack any substantial real energy storage and are simply voltage-sourced converters that absorb or supply reactive power to the grid via a step up transformer. In present devices, only transient energy storage is provided by a relatively small DC capacitor, common to all phases of the power system, that is used to exchange reactive power between the phases.

The present invention attempts to overcome problems of transmission and distribution line instability and control the transmission voltage by controlling reactive power on the transmission and distribution line.

BRIEF DESCRIPTION OF THE DRAWING

The invention is explained in the following description in view of the drawings that show:

The sole FIGURE is a schematic diagram of an automatic self-adjusting voltage controller according to the present invention.

DETAILED DESCRIPTION OF THE INVENTION

Before describing in detail the particular methods and apparatuses related to controlling reactive power on a power grid in accordance with various aspects of the present invention, it should be observed that the present invention, in its various embodiments, resides primarily in a novel and non-obvious combination of hardware, method steps and software elements related to said method and apparatus. Accordingly, the hardware, method steps and software elements have been represented by conventional elements in the drawings, showing only those specific details that are pertinent to the present invention so as not to obscure the disclosure with structural details that will be readily apparent to those skilled in the art having the benefit of the description herein.

The following embodiments are not intended to define limits of the structures or methods of the invention but only to provide exemplary constructions. The embodiments are permissive rather than mandatory and illustrative rather than exhaustive.

The use of voltage sourced converter controllers to draw reactive power from or supply reactive power to a transmission line is known. The voltage sourced converter controllers are connected at points along the transmission line, each controlling the reactive power at its connection point. The amplitude of the current/power supplied by the voltage sourced converter controller is rapidly controllable by operation of controllable switches (e.g., thyristors) within the controller.

The present invention uses two voltage sourced converter controllers (VSC) connected at spaced-apart nodes of a transmission or distribution line. The two controllers cooperate to control the reactive power at their respective nodes and in this way control the total power on the intervening transmission line. One VSC injects capacitive reactive power into a node while the other draws inductive reactive power from the other node.

A balance scale may be a useful analogy to better understand the invention. If the balance scale is out of balance (e.g., a voltage disturbance on a segment of the power line), it is necessary to add weight to a pan one side of the balance and remove weight from the other pan. By analogy, capacitive reactive power is added and inductive reactive power is drawn. Of course adding weight to one pan without removing weight from the other will achieve the balance objective, i.e., adding capacitive reactive power without drawing inductive reactive power.

But the objective can be realized quicker and more efficiently by simultaneously adjusting the weight in both pans, i.e., adding weight to one while removing weight from the other. Thus two cooperating VSCs permit the line to return to its desired voltage faster than a single VSC operating alone. Additionally, by both injecting and drawing reactive power at two spaced-apart locations, each VSC can include a capacitor with a lower capacity rating than when employing only one VSC to achieve the same result.

The sole FIGURE illustrates a segment of an AC power transmission system (or a distribution system) including a transmission line 10 with a segment 10A bounded by spaced-apart nodes 20 and 22. Voltage sourced converter controllers (VSC) 14 and 18 are connected to the respective nodes 20 and 22. According to the present invention, the VSCs cooperate to control the transmission line voltage on the segment 10A between the nodes 20 and 22. One voltage sourced converter controller withdraws or absorbs inductive reactive power (current) from the transmission line 10 while the other supplies capacitive reactive power (current) to the transmission line 10. The combination of the VSCs 14 and 18 can be referred to as a self-adjusting voltage controller or a voltage stabilizer.

Preferably, each voltage sourced converter controller 14 and 18 is configured as a voltage sourced converter for converting DC (supplied from a storage capacitor) to AC. Each voltage sourced converter controller 14 and 18 includes an array of solid state switches, such as gate turn-off switches (GTO's), that generate reactive power for supplying to one of the nodes 20 and 22 and for drawing reactive power from the other of the nodes 20 and 22.

Only a single phase of a three-phase transmission line is illustrated in the FIGURE for clarity, but in practice the invention is typically applied to three-phase transmission systems. Specifically, a node 41 of the VSC controller 14 is connected to the transmission line node 20 through a coupling transformer/reactor 43, which is illustrated in the FIGURE by its leakage inductance that acts as a reactor between the node 41 and the transmission line node 20. The voltage at the node 41 is designated $V_{01}$. Nodes 45 and 47 are similarly connected to the respective phase conductors B and C of the AC power transmission system; these phase conductors are not illustrated in the FIGURE.

A node 51 of the VSC controller 18 is connected to the transmission line node 22 through a coupling transformer/reactor 53, which is illustrated in the FIGURE by the transformer leakage inductance that acts as a reactor between the node 51 of the VSC controller 18 and the transmission line node 22. The voltage at the node 51 is designated $V_{02}$. Nodes 55 and 57 are similarly connected to the respective phase B and C conductors of the AC power transmission system; these phase conductors are not illustrated in the FIGURE.

Returning to the VSC controller 14, the node 41 is connected between a first parallel combination of a diode 60A and a gate turn-off switch (diode) 61A and a second parallel combination of a diode 62A and a gate turn-off switch 63A. The "A" refers to phase conductor A and the connection polarity of the diodes and gate turn-off switches is as illustrated. Each control lead 65 of the gate turn-off switches 61A and 63A is connected to a controller (not shown) as is known in the art. The turn-on and turn-off time of the gate turn-off switches 61A and 63A and the dwell time for each switch state are controlled by gating signals generated in the controller by processing the voltage difference between a reference value and a measured value $V_0$ of the transmission line voltage through a proportional integral controller. These parameters determine the amount of reactive power that is added to or drawn from the transmission line at the nodes 20 and 22.

A similar circuit configuration of diodes 60B, 62B, 60C and 62C and gate turn-off switches 61B, 61C, 63B and 63C are connected to the phase B and C conductors through a coupling transformer (not illustrated) and the respective node 45 or 47.

For the VSC controller 18, the node 51 is connected between a first parallel combination of a diode 70A and a gate turn-off switch (diode) 71A and a second parallel combination of a diode 72A and a gate turn-off switch 73A. The "A" refers to phase conductor A and the connection polarity of the diodes and gate turn-off switches is as illustrated. Each control lead 75 of the gate turn-off switches 71A and 73A is connected to a controller (not shown) as is known in the art. The turn-on and turn-off time of the gate turn-off switches 71A and 73A and the dwell time for each switch state are determined by the controller responsive to the transmission line voltage $V_0$.

A similar circuit configuration of diodes 70B, 72B, 70C and 72C and gate turn-off switches 71B, 71C, 73B and 73C and connected to the phase B and C conductors through a coupling transformer and the respective node 55 or 57.

A DC voltage ($V_{DC}$) for the VSC controllers 14 and 18 is supplied from respective capacitors 86 and 87. The capacitors 86 and 87 remain charged while the VSC controllers 14 and 18 remain in operation. The capacitor 86 charges through the node 20 of the phase conductor A through the diodes 60A and 62A. The capacitor 86 also charges from the phase B and phase C conductors through the diodes 60B/62B and 60C/62C.

The capacitor 87 charges from the node 22 of the phase conductor A through the diodes 70A and 72A. The capacitor 87 also charges from the phase B and phase C conductors through the diodes 70B/72B and 70C/72C.

With reference to the voltage-sourced converter controller 14, if the controller alternately turns on and off the gate turn-off switches 61A and 63A (with reference to the phase A conductor), a voltage ($V_{01}$) is generated at the node 41. A voltage on the transmission line 10 is referred to as $V_L$. If $V_L = V_{01}$ then no current flows between the nodes 20 and 41 through the leakage inductance 43. The VSC 18 functions in a similar manner.

If the same gate turn-off switches 61A and 63A are controlled such that $V_L > V_{01}$ (with $V_L$ in phase with $V_{01}$) current is drawn from the node 20 through the leakage inductance 43 and the node 41. The current is referred to as an inductive reactive current as its purpose is to reduce the voltage $V_L$ on the transmission line 10 down to a value $V_{01}$ or to absorb or draw reactive power from the transmission line 10.

The capacitors 86 and 87 (at the respective voltage sourced converter controllers 14 and 18), which are common to all three phase conductors (as illustrated), redistribute the inductive and capacitive reactive currents among the three phase conductors. No real power is generated and no real power is consumed by operation of the voltage sourced converter controllers 14 and 18.

Referring to the voltage sourced converter 18, if the gate turn-off switches 71A and 73A (with reference to the phase A conductor) are controlled to generate a voltage $V_{02}$ at the node 51 that is greater than $V_L$, current is injected into the node 22 from a node 51 to boost the voltage $V_L$ on the transmission line 10. This current is referred to as capacitive reactive current.

Arrowheads 90 and 91 in the FIGURE indicate the direction of the respective inductive and capacitive reactive currents. Although preferably the quantity of capacitive and inductive reactive currents are equal, this condition is not required. The amount of supplied and absorbed reactive power/current of the voltage sourced converter controllers 14 and 18 is independently fully controllable and it is therefore not necessary that these two values be equal.

In another embodiment, the two capacitors 86 and 87 may be connected together, as represented by dashed lines 100 and 101, such that only one capacitor bridges the two voltage sourced converters for developing the DC voltage required by the voltage sourced converters 14 and 18. It may also be possible to merge the two converters 14 and 18 for generating both inductive and capacitive current to supply to the transmission line 10.

It is observed that the voltage source converters 14 and 18 function automatically, responsive to the transmission line voltage $V_0$, to instantaneously add and absorb reactive power as required to control the transmission line voltage.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus for controlling a voltage on a transmission line, the apparatus comprising
    a first voltage sourced converter controller connected to a first node of the transmission line;
    a second voltage sourced converter controller connected to a second node of the transmission line, the second node spaced apart from the first node;
    wherein the first voltage sourced converter controller supplies capacitive reactive current and the second voltage sourced converter controller absorbs inductive reactive current to control the voltage.

2. The apparatus of claim 1 wherein the capacitive reactive current comprises capacitive reactive power and the inductive reactive current comprises inductive reactive power.

3. The apparatus of claim 2 wherein the capacitive reactive power and the inductive reactive power are each measured in VARS.

4. The apparatus of claim 1 wherein the first and the second voltage sourced converter controllers each comprise a capacitor and a plurality of gate turn-off switches, the gate turn-off switches of the first voltage sourced converter controller configured and controlled to supply capacitive reactive current and the gate turn-off switches of the second voltage sourced converter controller configured and controlled to absorb inductive reactive current.

5. The apparatus of claim 1 further comprising a capacitor bridging the first and the second voltage sourced converter controllers, the first and the second voltage sourced converter controllers each comprising a plurality of gate turn-off switches, the gate turn-off switches of the first voltage sourced converter controller configured and controlled to supply capacitive reactive current and the gate turn-off switches of the second voltage sourced converter controller configured and controlled to absorb inductive reactive current.

6. The apparatus of claim 1 wherein the first and the second voltage sourced converter controllers are connected to the respective first and second nodes through a coupling transformer.

7. The apparatus of claim 1 wherein the first voltage sourced converter controller supplies capacitive reactive current when a transmission line voltage is less than a voltage at a node of the first voltage sourced converter controller and wherein the second voltage sourced converter controller absorbs inductive reactive current when a transmission line voltage is greater than a voltage at a node of the second voltage sourced converter controller.

8. The apparatus of claim 1 wherein the transmission line comprises a three-phase transmission line, further comprising a phase A conductor, a phase B conductor and a phase C conductor, and wherein,
the first voltage sourced converter controller is connected to a first node of the phase A conductor, a first node of the phase B conductor and a first node of the phase C conductor;
the second voltage sourced converter controller is connected to a second node of the phase A conductor, a second first node of the phase B conductor and a second node of the phase C conductor;
the first node of the phase B conductor spaced apart from the second node of the phase B conductor and the first node of the phase C conductor spaced apart from the second node of the phase C conductor; and
wherein the first voltage sourced converter controller supplies capacitive reactive current and the second voltage sourced converter controller absorbs inductive reactive current to control the voltage on the phase A, phase B and phase C conductors.

9. The apparatus of claim 8 wherein the first voltage sourced converter controller comprises:
a first and a second circuit connected in series with a third node disposed therebetween, the first and the second circuits each comprising a parallel combination of a gate turn-off switch and a diode;
a third and a fourth circuit connected in series with a fourth node disposed therebetween, the third and the fourth circuits each comprising a parallel combination of a gate turn-off switch and a diode;
a fifth and a sixth circuit connected in series with a fifth third node disposed therebetween, the fifth and the sixth circuits each comprising a parallel combination of a gate turn-off switch and a diode;
a capacitor connected in parallel with the series connection of the first and the second circuits, the series connection of the third and the fourth circuits, and the series connection of the fifth and the sixth circuits; and
the third node connected to the first node of the phase A conductor through a first coupling transformer, the fourth node connected to the first node of the phase B conductor through a second coupling transformer and the fifth node connected to the first node of the phase C conductor through a third coupling transformer.

10. The apparatus of claim 8 wherein the second voltage sourced converter controller comprises:
a first and a second circuit connected in series with a third node disposed therebetween, the first and the second circuits each comprising a parallel combination of a gate turn-off switch and a diode;
a third and a fourth circuit connected in series with a fourth node disposed therebetween, the third and the fourth circuits each comprising a parallel combination of a gate turn-off switch and a diode;
a fifth and a sixth circuit connected in series with a fifth third node disposed therebetween, the fifth and the sixth circuits each comprising a parallel combination of a gate turn-off switch and a diode;
a capacitor connected in parallel with the series connection of the first and the second circuits, the series connection of the third and fourth circuits, and the series connection of the fifth and sixth circuits; and
the third node connected to the second node of the phase A conductor through a first coupling transformer, the fourth node connected to the second node of the phase B conductor through a second coupling transformer and the fifth node connected to the second node of the phase C conductor through a third coupling transformer.

11. A method for controlling the voltage on a transmission line having first and second spaced-apart nodes, the method comprising:
supplying capacitive reactive current at the first node, the capacitive reactive current supplied from a first voltage sourced converter controller; and
absorbing inductive reactive current at the second node, the inductive reactive current absorbed at a second voltage sourced converter controller.

12. The method of claim 11 further comprising;
storing energy in a first capacitor of the first voltage sourced converter controller; and
storing energy in a second capacitor of the second voltage sources converter controller.

13. The method of claim 11 wherein the first voltage sourced converter controller supplies the capacitive reactive current to the first node through a first coupling transformer and the second voltage sourced converter controller absorbs the inductive reactive current from the second node through a second coupling transformer.

14. The method of claim 11 wherein a step of supplying capacitive reactive current is executed when a transmission line voltage is less than a voltage at the first voltage sourced converter controller and wherein the step of absorbing inductive reactive current is executed when a transmission line voltage is greater than a voltage at the second voltage sourced converter controller.

* * * * *